United States Patent [19]
Dybala et al.

[11] 3,978,184
[45] Aug. 31, 1976

[54] METHOD OF TWO-STEP BLOW MOLDING EMPLOYING A TRANSFER CLAMP

[75] Inventors: Ambrose B. Dybala; Thomas J. Krall; Albert R. Uhlig, all of Toledo, Ohio

[73] Assignee: Owens-Illinois, Inc., Toledo, Ohio

[22] Filed: July 22, 1974

[21] Appl. No.: 490,713

[52] U.S. Cl. ................................. 264/89; 264/98; 264/296; 425/DIG. 213; 425/DIG. 215; 425/DIG. 216
[51] Int. Cl.² ......................................... B29C 17/07
[58] Field of Search .................. 264/89, 90, 92, 94, 264/98, 99, 296; 425/326 B, 387 B, DIG. 213, DIG.215, DIG. 216

[56] References Cited
UNITED STATES PATENTS

| | | | |
|---|---|---|---|
| 2,331,702 | 10/1943 | Kopitke | 264/97 |
| 2,718,724 | 2/1973 | Holzmann et al. | 264/98 |
| 3,325,862 | 6/1967 | Mehnert | 264/98 X |
| 3,525,123 | 8/1970 | Cines et al. | 425/DIG. 216 |
| 3,596,315 | 8/1971 | Yoshikawa et al. | 425/DIG. 213 |
| 3,632,261 | 1/1972 | Gasior et al. | 425/387 B X |
| 3,754,851 | 8/1973 | Reilly et al. | 264/98 X |
| 3,767,747 | 10/1973 | Uhlig | 264/98 X |
| 3,781,395 | 12/1973 | Uhlig | 264/98 X |

*Primary Examiner*—Jan H. Silbaugh
*Attorney, Agent, or Firm*—Richard D. Heberling; E. J. Holler

[57] ABSTRACT

A method for blow molding plastic articles, particularly containers. The method involves shuttling a pre-form blow mold between a parison forming location and a pre-form blowing location, and the transfer of a blown pre-form to a fixed final blow mold. The movement of the pre-form blow mold, both in its shuttling movement and in its open and closing movement, is utilized to transfer the blown pre-form. A clamp arm is secured to each pre-form mold section for engaging the pre-form at the pre-form blowing location and for transferring the pre-form to the final blow mold as the pre-form blow mold moves.

The clamp arms form the finish-defining portions of the final blow mold. When the pre-form blow mold is at its blowing location, the clamp arms register with the mold cavity of the fixed final blow mold to define the complete final article mold. The blown pre-form can be axially stretched during its transfer from the pre-form blowing location to the final blowing location and as the pre-form is retained by the clamp means.

10 Claims, 21 Drawing Figures

METHOD OF TWO-STEP BLOW MOLDING EMPLOYING A TRANSFER CLAMP

RELATED APPLICATIONS

This application discloses a blow mold method and apparatus similar to that disclosed in U.S. Pats. of Albert R. Uhlig No. 3,767,747 and No. 3,781,395, both of these patents being assigned to the assignee of this application.

BACKGROUND OF THE INVENTION

In both of the above-identified, patents of Albert R. Uhlig, there is disclosed a blow molding method and apparatus wherein a tubular parison is blown to a blown pre-form, and this pre-form is then blown to the final article. This two-step blowing process is quite advantageous in that it (1) substantially doubles the output capacity of the blow molding machine, (2) cools the blown pre-form so that the final blowing operation can be carried out while the blown pre-form is at a temperature conducive to bi-axial orientation, and (3) makes possible the blowing of articles such as handled containers with minimal flash.

Generally, these prior processes include the provision of separate and distinct blowing molds for the pre-form and for the final article, and these molds are jointly displaced relative to the fixed parison forming station. The entire mass of both the pre-form blow mold and the final blow mold, together with their related clamping equipment, must be transported toward and away from the parison forming station.

This necessity for transporting the entire mold weight, including the large final blow molds has imposed some severe restrictions on the size of machines of this type. For example, the manufacture of large containers and the utilization of multiple cavities for the simultaneous manufacture of several containers has been inhibited because of the large mass of molds and clamping equipment which must be transported. Further, the necessary tie bars and the size of the mold-carrying platens has also limited the design to a relatively small mold clamping area.

BRIEF DESCRIPTION OF THE PRESENT INVENTION

The present invention now proposes a method for solving the above-identified machine design problems in apparatus of the type wherein a blown pre-form and a blown final article are formed in separate blow molds. Essentially, the present invention utilizes a fixed final blow mold, with the movement of the pre-form blow mold being utilized to transfer the blown pre-form to the final blow mold. Thus, only the relatively smaller pre-form mold need be transported during the article forming process. Additionally, this transfer can be accomplished without interference from the tie bars and other clamping equipment associated with either mold.

More specifically, the pre-form blow mold is shuttled as in the earlier described Uhlig inventions between a parison forming location and a pre-form blowing location, a previously blown pre-form being retained on the blow pipe at the location where it was blown. A clamp arm is secured to each pre-form mold section, and these clamp arms engage the pre-form when the pre-form blow mold is closed on the parison at the parison forming station. Upon withdrawal of the blow pipe and movement of the pre-form blow mold to the pre-form blowing location, the clamp arms transport the pre-form to the final blow mold.

Since the clamp arms are carried by the pre-form blow mold, they can be located precisely with respect to the blown pre-form. When the article being manufactured is a container, the clamp arms define the finish of the final container. By engaging the finish-defining portions of the final blow mold with the pre-form, and then transporting the pre-form to the remainder of the final mold, no final finish trimming operation is necessary, and the fixed blow mold simply defines the blown body of the container, i.e. the container less the finish.

Since the blown pre-form is engaged at its finish portion by the transfer arms, additional sets of clamp arms can be provided to engage the tail of the pre-form. If the two transfer arms are then moved apart, the pre-form can be axially stretched intermediate the pre-form blowing and the final article blowing steps, to enhance any axial orientation in the final article.

OBJECTS

It is, therefore, an important object of the present invention to provide an improved method of blow molding plastic articles in sequencial pre-form blowing and final article blowing steps with minimal movement of and minimal interference from the final blow molds and related clamping equipment.

Another important object of this invention is the provision of a method for blow molding plastic articles wherein a parison is blown to a preform in a movable pre-form blowing mold and the movement of this pre-form blowing mold is utilized to transfer the blown pre-form to a final blowing station.

A further object of this invention is the provision of a method for blow molding a container or the like wherein a blown pre-form having a finish portion and a body portion is transported to a final body-blowing mold by engagement of the final finish mold with the pre-form.

A further object of this invention is the provision of a blow molding process wherein a pre-form blow mold shuttles between a parison forming location and a pre-form blowing location and the movement of the pre-form blow mold is utilized to transfer the blown pre-form to a fixed final blow mold.

Yet another, and no less important, object of this invention is to provide a method of making containers wherein a blown pre-form is transported to a fixed final blowing location by transfer means engaging the finish and the tail of the blown pre-form, and the transfer mechanism is actuated to axially stretch the pre-form during transfer and prior to final blowing.

Other and further objects of the present invention will be apparent from the following disclosure and claims.

AS SHOWN ON THE DRAWINGS THE EMBODIMENT OF FIGS. 1-9

Figure 1:
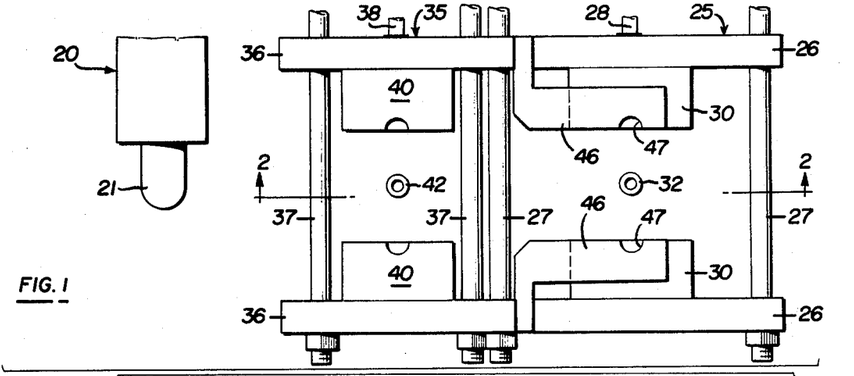
FIG. 1 is a plan view of an apparatus of the present invention capable of carrying out a method of the present invention.
Figure 2:
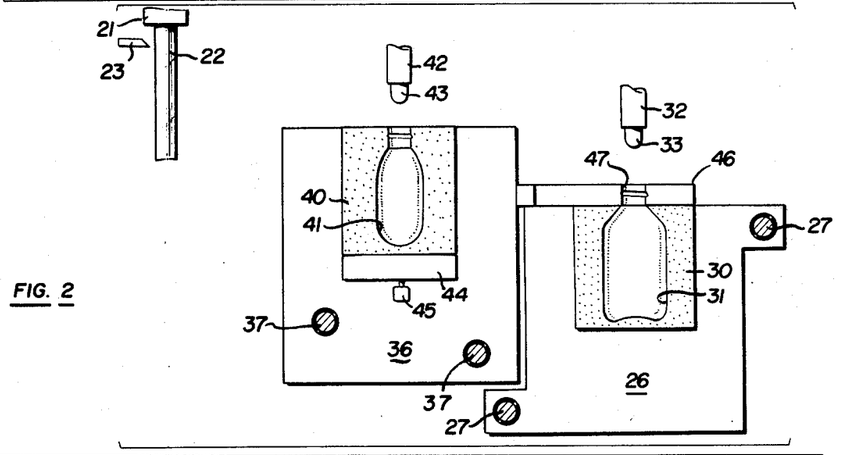
FIG. 2 is a sectional view taken along the plane 2—2 of FIG. 1.

In FIGS. 1 and 2, an initial form of the apparatus of the present invention is illustrated in a start-up position, in order to clarify the method of the present invention. The apparatus of the present invention includes an extruder 20 having an outlet nozzle 21 from which a freely pendant, extruded, tubular parison 22 is at a fixed parison-forming station.

Spaced to one side of the parison-forming station is a fixed blow mold indicated generally at 25. This blow mold 25 is the final blow mold, and includes a pair of platens 26 displaceable along tie bars 27 by a power means including a piston rod 28 and a fluid pressure actuated cylinder (not shown). Carried by the platens 26 is a pair of blow mold sections 30 cooperatively defining an interior final blow mold cavity 31. This blow mold cavity conforms in shape to the configuration of the blown body part of a container or the like to be made by the method and apparatus of the present invention. Overlying the blow mold and vertically displaceable relative thereto is a blow tube 32 which is axially aligned with the cavity 31 when the blow mold sections 30 are closed. This blow tube 32 is provided with a reduced end portion 33 insertable into the finish of a container or like article being made at the final blow mold station which is defined by the location of the mold halves 30.

Figure 3:
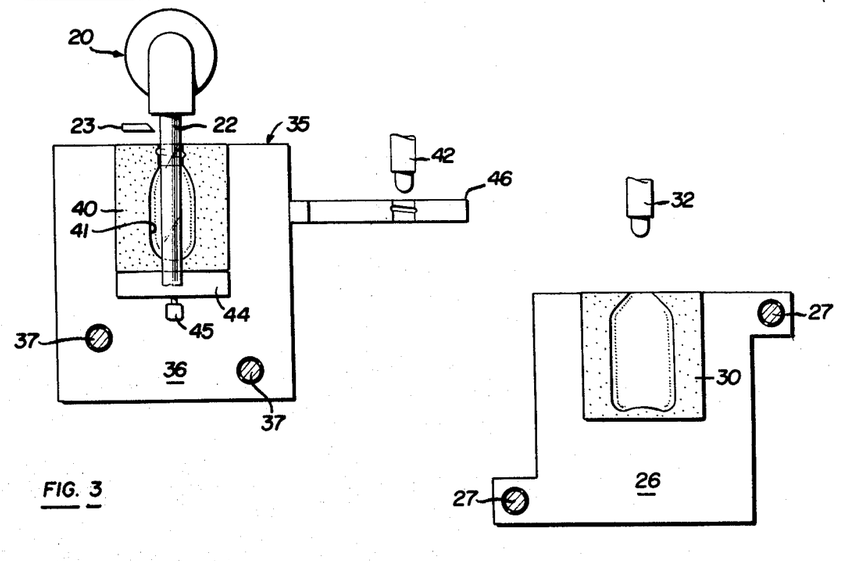
FIGS. 3, 4 and 5 are sectional views similar to FIG. 2 illustrating consecutive steps in the operation of the method.

Interposed between the final blow mold station and the mold halves 30 and the parison-forming station and the tubular parison 22 is a laterally displaceable pre-form blow mold indicated generally at 35. This pre-form blow mold when located as illustrated in FIGS. 1 and 2 is positioned at a pre-form blowing location. As illustrated in FIG. 3 of the drawings, the pre-form mold 35 is at the parison-forming station. The pre-form mold assembly 35 is appropriately guided and actuated for linear motion between these two stations. The guiding and actuating mechanism is not illustrated in the drawings of this application, but such guiding and actuating mechanisms are well-known in the art and it appears unnecessary to illustrate this structure here.

The pre-form blow mold assembly 35 includes a pair of platens 36 guided for opening and closing movement on tie rods 37 and actuated for opening and closing movements by power means (not shown) including a piston rod 38. Mounted on each platen 36 is a mold half 40, these mold halves, when closed, defining an interior mold cavity 41 defining at its upper region a container finish, and at its lower regions a blown body portion which is somewhat smaller than the blown body portion of the finished container to be made in the apparatus. An overhead, vertically moveable blow pipe 42 having a reduced end 43 for insertion into the cavity 42 is provided in vertical alignment with mold cavity 41 when the mold sections 40 are closed and at the per-form blowing station. The mold halves 40 also carry conventional tail-removal plates 44 suitably actuated, as by a hydraulic cylinder 45 for movement downwardly relative to the mold cavity 41 for the removal of the pinched tail which is formed when the blow mold sections 40 close on the tubular parison 22. All of this tail removal apparatus also is well-known in the art, and it does not appear necessary to disclose it in detail in this application.

Each pre-form blow mold platen 36 carries a clamp arm indicated generally at 46 and projecting laterally from each platen 36 toward the final blow mold sections 30. As illustrated, these clamp arms 46 are located vertically so as to closely overlie the mold sections 30 and to vertically register with the final blow mold cavity 31 when the pre-form mold 35 is in its pre-form blowing location illustrated in FIGS. 1 and 2. These clamp arms 46 each have a vertical passage 47 therein, and this passage is interiorly contoured to define the final finish of the container which is finally blow molded in the final blow mold cavity 31. As well shown in FIGS. 2 and 7, this vertical passage 47 is interposed between the mold cavity 31 and the upper blow pipe 32 and registers with the cavity 31.

Since the clamp arms 46 are carried by the mold platens 36, they move with the mold platens as these platens are transferred from the pre-form blowing location of FIG. 2 to the parison-forming station of FIG. 3. When the pre-form blow mold 35 is in its position of FIGS. 3 and 5, the passages 47 in the clamp arms 46 are vertically aligned with the pre-form blow pipe 42.

These clamp arms 46 also open and close with movement of the platens 36 and the pre-form mold sections 40.

Figure 4:
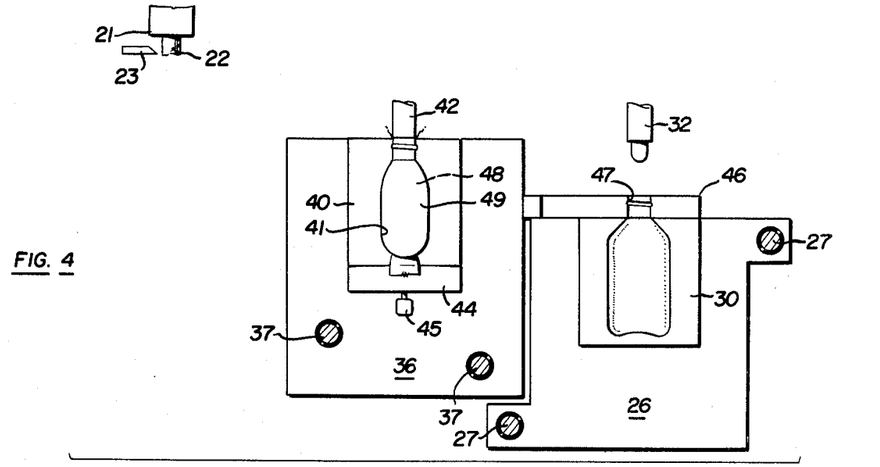
Figure 5:
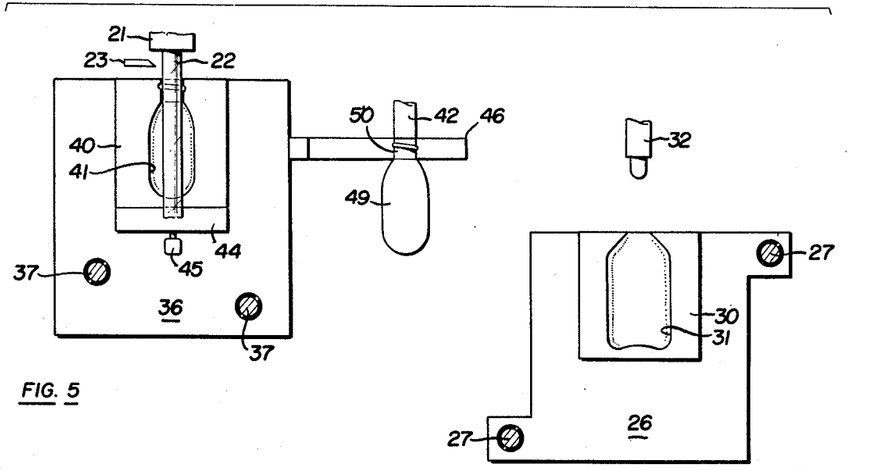
Figure 6:
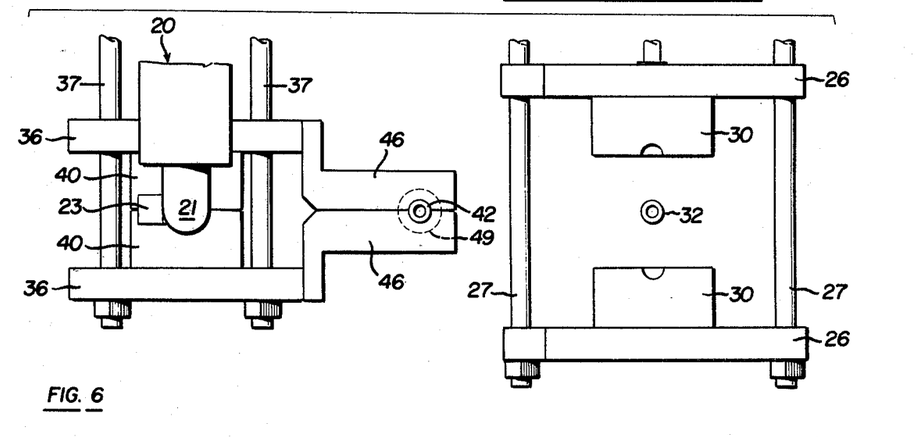
FIG. 6 is a plan view similar to FIG. 1 illustrating the apparatus carrying out the step of FIG. 5.

Turning now to the operation of the machine, the first step in the method of the present invention is illustrated in FIG. 3, wherein the pre-form blow mold 35 is shuttled transversely and vertically to the parison-forming station while the blow mold sections 40 are opened as illustrated in FIG. 1. Next, the pre-form blow mold sections 40 are closed at the parison-forming station to pinch the tube 22 shut. At about the same time, a knife 23 is actuated to sever the tube 22 from the extrusion nozzle 21. Next, the pre-form blow molds are moved transversely and downwardly to the pre-form blowing station, as illustrated in FIG. 4 of the drawings. At this time, the blow tube 42 is moved downwardly into the pinched parison 48 and the parison is inflated interiorly of the mold cavity 41 to form the blown pre-form.

While the mold sections 40 are still closed, the tail pulling plates 44 are actuated and the pinched tail is removed from the pre-form.

Next, the mold sections 40 of the pre-form blow mold are opened to expose the blown pre-form 49 extending from and supported by the blow pipe 42. Because of the configuration of the blow mold cavity 42, a preliminary finish 50 has been formed on the blown pre-form, and this finish surrounds the reduced lower end 43 of the blow tube 42. Next, the open pre-form blow molds return to the parison-forming station for the formation of the next pinch parison. This motion of the open pre-form blow molds positions and aligns the clamp arms 46 at the pre-form blowing station. Since the pre-form blow molds are open, the separated clamp arms are positioned in spaced, but aligned, relation to the preliminary finish on the pre-form 49 surrounding the reduced end portion 43 of the blow tube 42.

Next, the pre-form blow molds are closed on the tube 42 to form the pinched parison 48. Simultaneously, the clamp arms 46 are closed onto the preliminary finish of the pre-form 49 still supported on the blow pipe 42. Then, the blow pipe 42 is retracted vertically upwardly by its actuating mechanism (not shown), and the blown pre-form 49 is now suspended from the closed clamp arms as clearly illustrated in FIGS. 5 and 6. The pre-form is still positioned at the pre-form blowing station.

Figure 7:
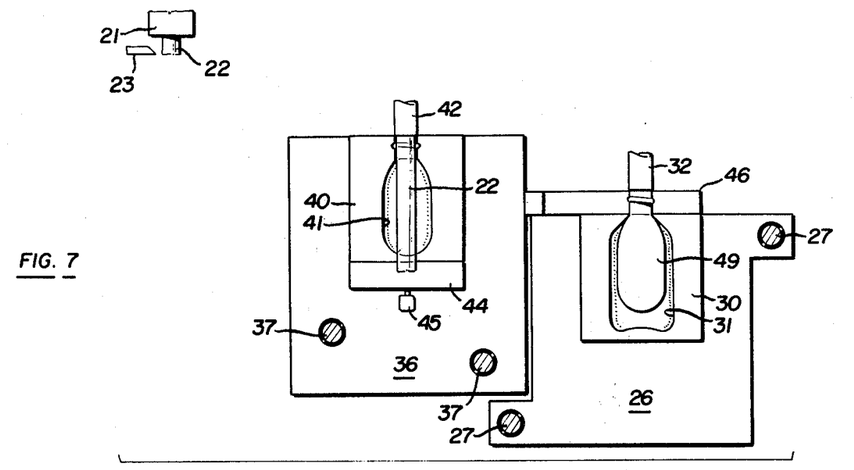
FIGS. 7 and 8 are similar to FIG. 2 illustrating later steps in the method.
Figure 8:
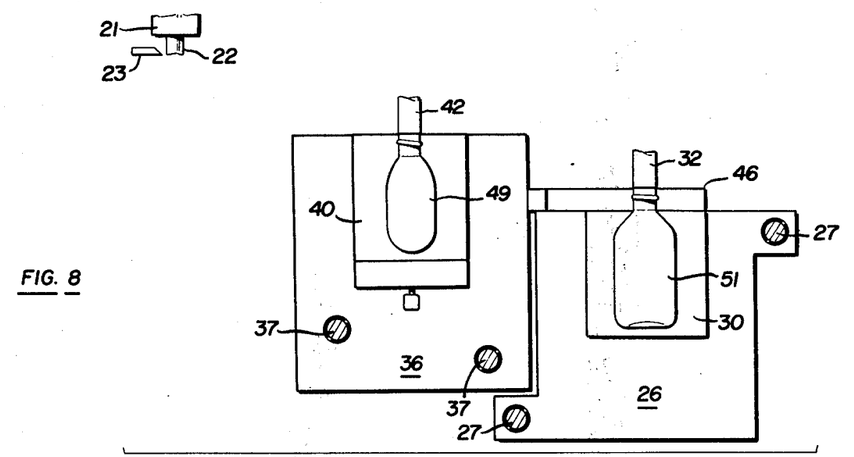

Next, the closed pre-form molds are transferred from their position at FIG. 3 (at the parison-forming station) to their position of FIG. 4 (at the pre-form blowing station). This motion of the pre-form blow molds moves the clamp arms and the blown preform suspended therefrom transversely and vertically to the final blow mold station as illustrated in FIG. 7. The final blow mold sections are still open, and this movement of the clamp arms disposes the blown pre-form between the open final blow mold sections 30 and in alignment with the blow cavity 31.

When the blow mold sections 30 are closed to define the blow mold cavity 31, these blow mold sections 30 close beneath the closed clamp arms 46. Next, the final blow tube 32 is actuated downwardly by its actuating mechanism (not shown) and blow air is introduced through the blow tube 32 into the blown pre-form disposed within the final blow mold cavity 31. The insertion of the reduced end 33 of the blow tube 32 into the preliminary finish of the article compression forms the finish of the bottle to its final configuration within the contoured passage 47 of the clamp arms 46 during the final blowing operation.

Figure 9:
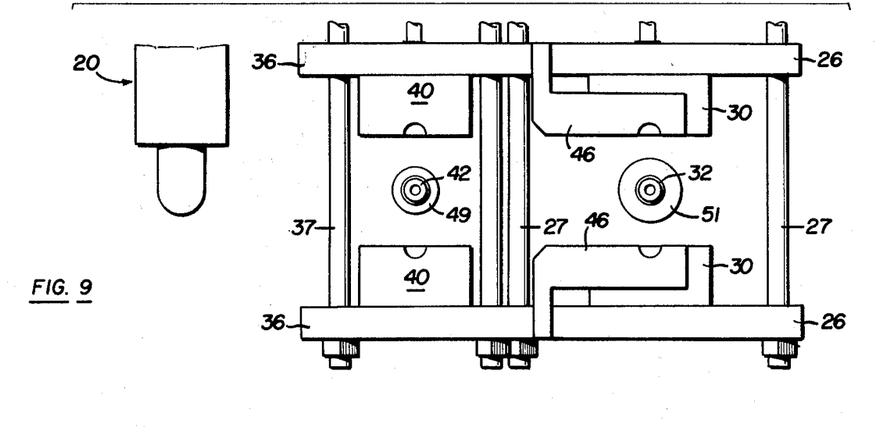
FIG. 9 is a view similar to FIG. 1 illustrating the conclusion of the method of FIGS. 1 – 8.

Finally, both the final blow mold sections 30 and the pre-blow mold sections 40 are opened as illustrated in FIG. 9 of the drawings and the final blow tube 32 is vertically retracted to release the final blow molded article 51. Of course, the opening of the pre-form blow mold sections 40 exposes the next blown pre-form still suspended upon the blow tube 42 for the next consecutive blowing operation. The cycle is then repeated.

Figure 10:
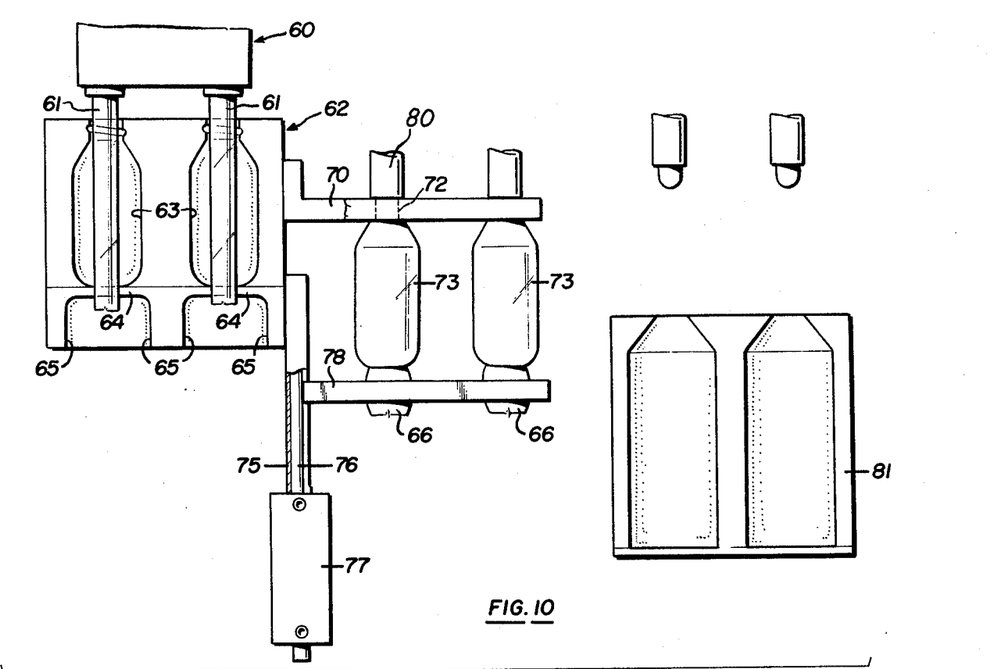
FIG. 10 is a view similar to FIG. 2 illustrating a different embodiment of the present invention and illustrating a different method wherein a blown pre-form is axially stretched.
Figure 11:
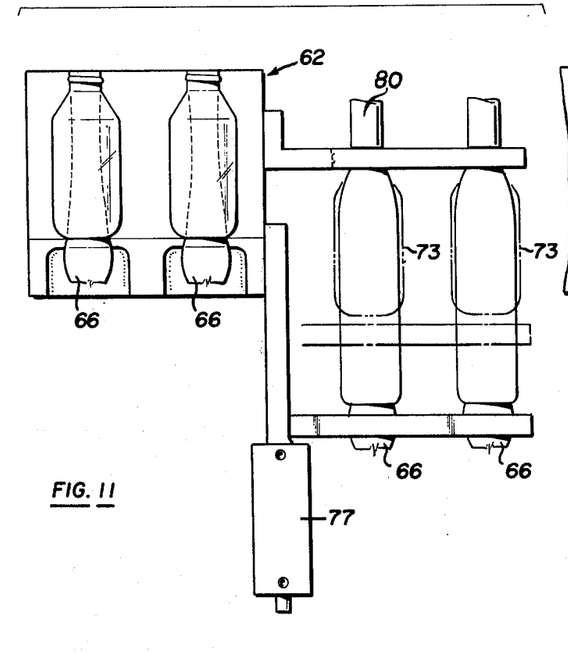
FIG. 11 is a view similar to FIG. 10 illustrating the stretching operation.
Figure 12:
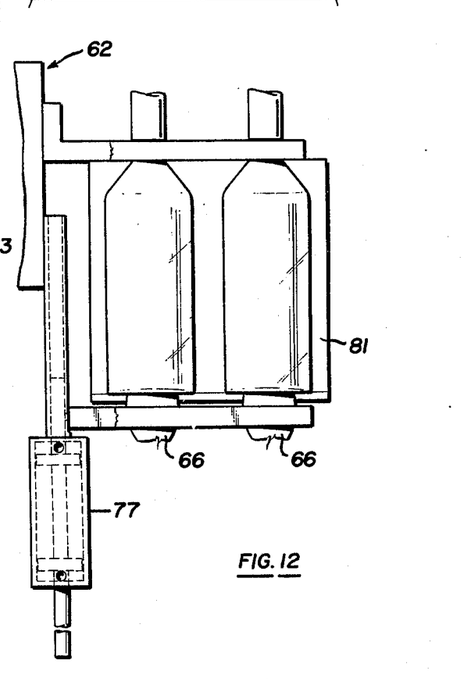
FIG. 12 is a fragmentary view similar to FIG. 10 showing the final blowing operation.

THE EMBODIMENT OF FIGS. 10-12

In FIGS. 10-12 there is illustrated a different embodiment of the present invention which carries out an additional function, i.e. the stretching of the blown pre-form before its final blowing.

In this version of the invention, a larger extruder is utilized for the similtaneous extrusion of two tubular parisons 61. The pre-form blow molds 62 defines a pair of interior pre-form blow mold cavities 63, each of these cavities incorporating a lower pinching portion 64 interposed between the pre-form blow mold cavities 63 and a lower recess 65 for the accommodation of a flattened tail 66 formed on each pre-form when the tubular parisons 61 are pinched shut by closure of the sectional pre-form blow mold 62.

Each of the mold sections constituting the mold 62 carries a clamp arm 70 similar to that clamp arm 46 heretofore described, each clamp arm being provided with a pair of vertical passages 72 for the retention of a pair of blown pre-forms 73 when the pre-form blow mold is opened, as above described. Fixed to each pre-form blow mold section 62 generally beneath the clamp arms 70 is a vertical guide tube 75 which projects downwardly therefrom. Guided in each guide tube 75 is a piston rod 76 of a lower hydraulic cylinder 77 secured to the free lower end of the tube 75. The tubes 75 are longitudinally slotted, so that a clamp arm 78 secured to the piston rod 76 can project to the slot to lie generally parallel to the upper clamp arms 70. The guide tubes 75, the clamp arms 78 and the associated actuating structure, 76, 77 are all openable and closeable with the pre-form mold sections 62.

In the operation of the device of FIGS. 10-12, the pre-form mold simultaneous 62 close on the extruded tubular parison 61 at the parison-forming station, pinching the tube shut and forming the extended tails 66 thereon as illustrated in FIG. 11.

After inflation of the pre-forms, the pre-forms again hang from the blow tubes 80 at the pre-form blow station when the pre-form molds are opened. When the pre-form blow mold sections are next closed at the parison forming station, the upper clamp arms 72 engage the finish of the blown pre-forms 73, and the lower clamp arms 78 engage the tails 66 of the blown pre-forms 73.

Next, the hydraulic cylinder 77 is actuated donwardly from its position in FIG. 10 to its position in FIG. 11, thus axially stretching the pre-forms 73. The extent of stretching is such that the pre-form bottles are vertically elongated to their full vertical extend when finally blown. This is illustrated by comparison of FIGS. 11 and 12.

After the stretching operation, the pre-form blow mold 62 then moves to its pre-blow station, and the pre-forms 73 are transferred to the final blow mold 81. When the stretched pre-forms are enclosed in the closed final blow mold sections 81, the finish of the bottle is retained by the upper clamp arms 70 and the tail of the bottle is still retained by the lower clamp arms 78. Closure of the blow molds takes place beneath the upper clamp arms 70 and above the lower clamp arms 78, the final blow molds 81 having pinching surfaces engaging the already pinched tails 66 above the point where these tails are retained by the arms 78 exterior to the molds. Upon final blowing, the resultant bottle still has the tails 66 attached thereto, but these are removed by conventional tail-pulling apparatus. The next opening of the pre-form blow mold sections 62 will release the final blown bottles. If desired the stretching step may be performed during transfer of the pre-form to the final blow molds 81 or in the final blowing position prior to closure of the final blow molds.

Figure 13:
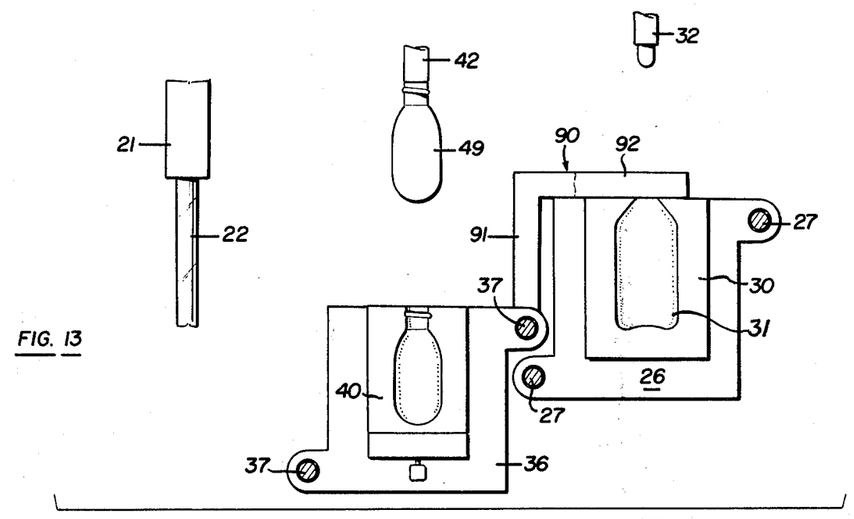
FIGS. 13, 14 and 15 are views similar to FIG. 2 illustrating a different method of the present invention and utilizing molds of different configuration.
Figure 14:
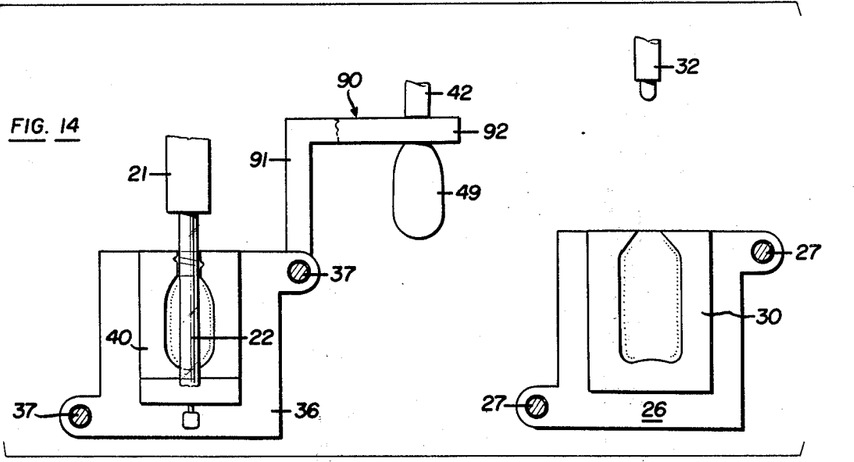
Figure 15:
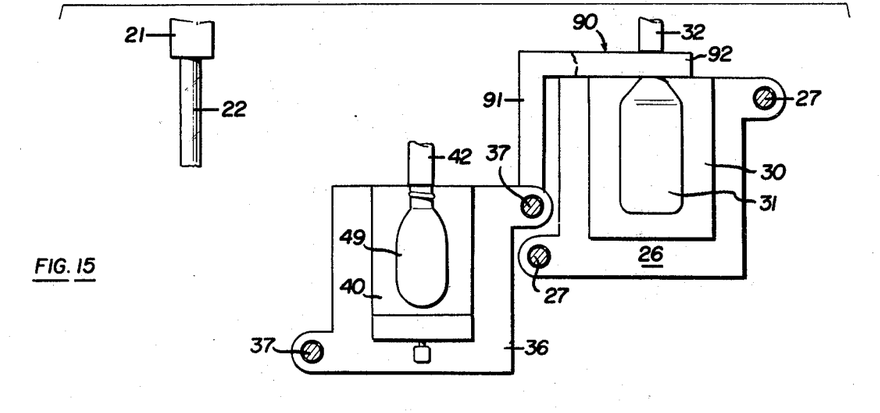

THE EMBODIMENT OF FIGS. 13-15

In the manufacture of some containers or the like, particularly containers of large size, some interference may be encountered from the tie bars upon which the mold platens slide. In these installations, the apparatus illustrated in FIGS. 13–15 is utilized. Since this apparatus is so similar to that of FIGS. 1–9, similar reference numerals are utilized to denote similar portions of the apparatus.

Essentially, it will be noted that the pre-form mold plates 36 of FIG. 13 are movable along guide rods 37 which are placed at the diagonal corners of the mold platens 36. This results in a stronger mold construction which may well be necessary to resist the clamping pressures required in the bloqing of larger pre-forms. However, the upper tie bar 37 would contact the blow tube 42 at the pre-blow station during shuttling of the pre-form mold to and from the parison-forming station.

To solve this problem, the blow tube 42 is moved vertically out of the way after the pre-form molding operation has been performed and while the blow pre-form 49 is still on the blow tube.42. This elevation of the pre-form blow tube 42 means that the blown pre-form 49 would be above the location of the clamp arms 46 if the clamp arm configuration of FIG. 1 were utilized.

Thus, the clamp arms are modified to that configuration shown in FIG. 13. More specifically, the clamp arms indicated generally at 90, are secured to the mold platen 36 to extend vertically therefrom, as at 91 and then horizontally therefrom, as at 92 to overlie the adjacent final blow mold sections 30. Because of this clamp arm configuration, the final blow mold 30 has been elevated to closely underlie the horizontal extent 92 of the clamp arms 90 when the preform mold sections 40 are in their pre-form molding position.

This geometric rearrangement modifies the method of molding to a minor extent only. Specifically, upon opening of the pre-form blow mold section 40, the pre-form blow tube 42 is elevated carrying with it the blown pre-form 49. After this elevation of pre-form blow tube 42, and only then, the pre-form blow molds return to the parison-forming station. The remainder of the blow molding process is carried out as described in connection with FIGS. 1–9.

THE EMBODIMENT OF FIGS. 16–21

In this embodiment of the invention, a different form of clamp arm is utilized.

More specifically, a stationary pivot block 100 is mounted vertically above and midway between the pre-form blow station and the final blow station. Further, these two blow stations are located at the same horizontal level, not vertically displaced relative to one another as in the earlier embodiments of the invention. Secured to this stationary pivot block 100 are a pair of parallel swinging arms or links 101 of a length sufficient to reach both the pre-form blowing and the final blowing station in the proper relationship to overlie the blow mold cavity at each of these stations. The links carry at their lower end a pair of transversely separable finish mold blocks 102 which are actuated into and out of cooperative molding relationship by actuating cylinders 103 having piston rods 104. The pivot arms 101 are medially joined by a pivotal joining link 106 and this joining link 106 in turn is connected by a pivot link 107 to a projection 108 on the pre-form mold platen 36.

Figures 16, 18:
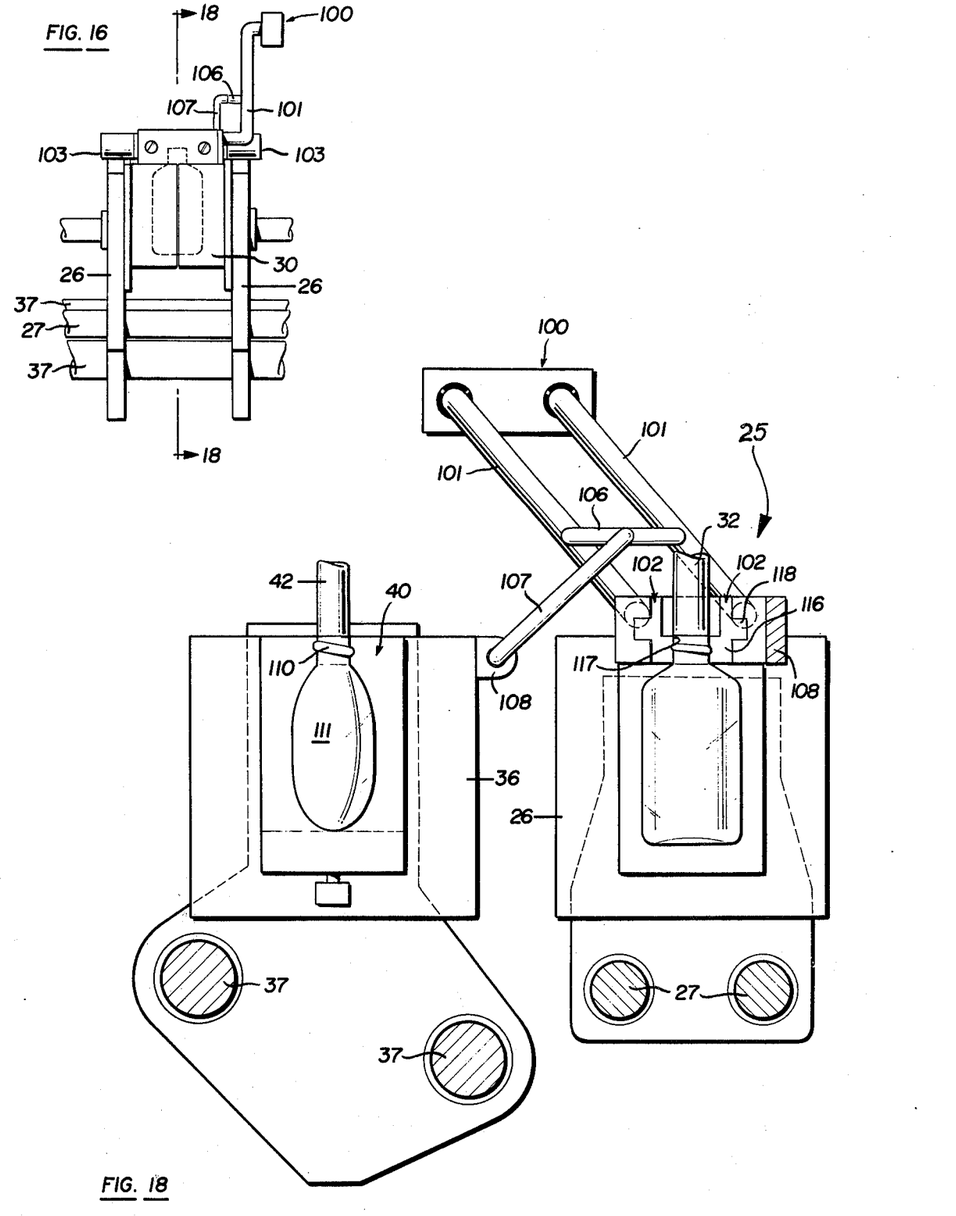
FIG. 16 is a side elevational view illustrating still another apparatus for carrying out a method of the present invention.
FIG. 18 is a view similar to FIG. 17 and showing the apparatus in an adjusted position.
Figure 17:
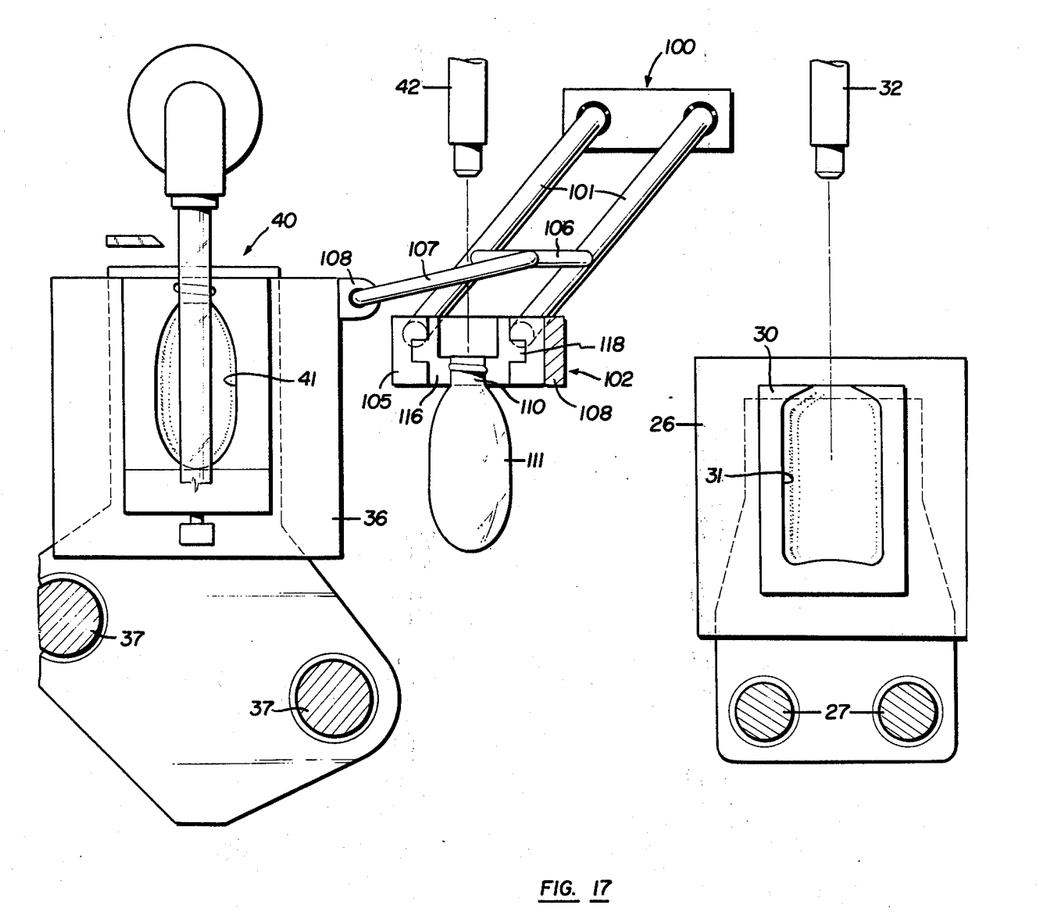
FIG. 17 is a sectional view taken along the plane 17—17 of FIG. 16 and illustrating the apparatus carrying out one step of the method.
Figure 19:
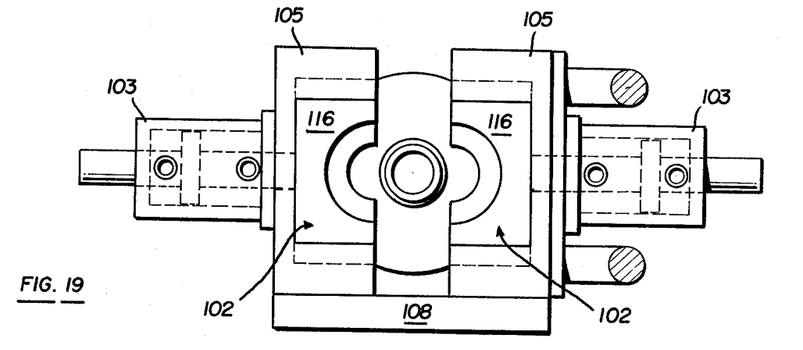
FIG. 19 is an enlarged fragmentary plan view showing, in detail, a portion of the apparatus of FIGS. 16–18.
Figure 20:
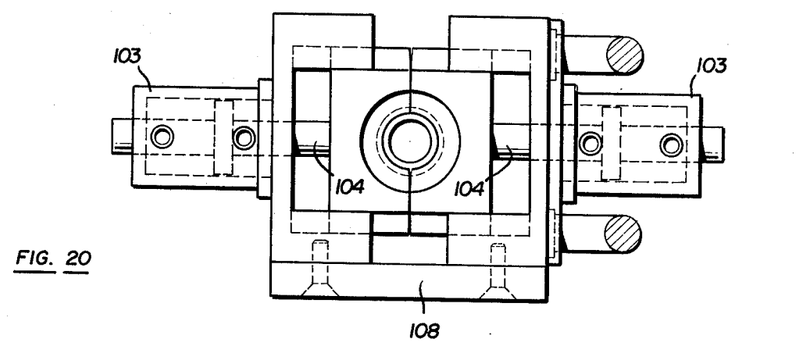
FIG. 20 is a view similar to FIG. 19 showing the apparatus in an adjusted position.
Figure 21:
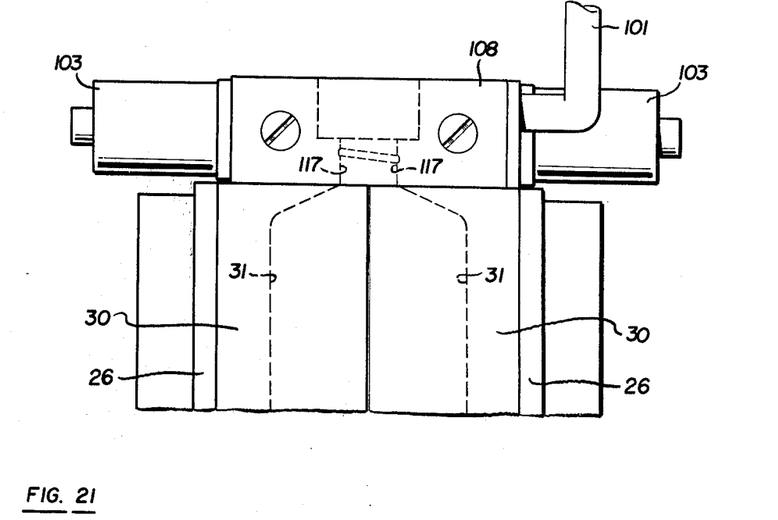
FIG. 21 is a side elevation of the apparatus of FIGS. 19 and 20.

As best shown in FIGS. 19–21, the finish mold blocks 102 each includes a fixed U-shaped guide 105 and a movable inner mold insert 116 guided by its fixed guide 105 for transverse movement. The two guides 105 are joined in transversely spaced relation by a support plate 108. The mold inserts 116 have their inner, confronting faces contoured to provide finish mold surfaces 117, while the outer surfaces of the inserts 116 are keyed to the guides 105, as at 118 (FIG. 18). The actuating rods 104 of the cylinders 103 are secured to inserts 116, and extension and retraction of the cylinders closes and opens the inserts 116 to and from their position of FIGS. 20 and 19. When the inserts 116 are open, as in FIG. 19, the separated blocks 102 receive therebetween the neck or finish portion 110 of a blown pre-form 111, previously formed in the pre-form mold 40 and still retained on blow pipe 42, as the pre-form blow mold 40 returns to the parison station.

Thus, when the pre-form mold assembly 35 is at the parison-forming station, (FIG. 17) the linkage 101, 106, 107 swings the finish mold blocks 102 to the pre-form blowing location, positioning the pre-form finish between the inserts 116. Actuation of the cylinder 103 then closes the inserts 116 on the finish of the previously blown pre-form. Upon retraction of the blow tube 42, the blown pre-form is suspended solely by the blocks 102. Since the finish mold blocks 102 are closeable independently of the pre-form mold assembly 35, the blown pre-form may be engaged by the blocks 102 before, after or during the closure of the mold assembly 35. However, the assembly 35 and the blocks 102 are closed while the apparatus is at its FIG. 17 position and prior to movement to the FIG. 18 position. Thus, these two operations are carried out "substantially simultaneously".

When the pre-form blow mold assembly 35 moves to the pre-form blowing station, the link 102 swings the two pivot links 101 and the blocks 102 to the final blow station, carrying with it the blown pre-form, as shown in FIG. 18. Upon closure of the final blow mold assembly 25 on the blown portion of the blown pre-form, the process is completed as above described in connection with earlier embodiments of the invention.

We claim:

1. In a blow molding process wherein a pre-form blow mold shuttles linearly between a first station and a second station, the pre-form blow mold being closed during its movement to the second station and opened during return movement to the first, and a final blow mold is fixed at a final blowing station, the steps of blowing a parison in said pre-form blow mold, opening said pre-form mold at said second station to expose a blown parison, retaining the exposed blown parison at the second station as the open pre-form blow mold moves back to the first station, the pre-form blow mold movement aligning a transfer clamp with a finished portion of the retained parison, substantially simultaneously closing the pre-form blow mold on a subsequently formed parison and clamping said parison finished portion in said transfer clamp, simultaneously transferring the pre-form blow mold with the subsequent parison therein to said second station and transferring the previously blown and clamped parison to said final blowing station, and blowing the non-clamped and non-finished portion only of the previously blown parison in said final blow mold at the final blowing station.

2. In a process as defined in claim 1, the further improvement of stretching the blown parison prior to blowing the parison into the final article.

3. In a process as defined in claim 1, the further improvement of stretching the blown parison during its transfer to the final blowing station.

4. In a method of blow molding a plastic container having a finish portion and a blown body portion, the steps of enclosing a parison at a parison-forming location in a pre-form blow mold having a cavity defining both a container finish and a blown body pre-form somewhat smaller than the container body portion, transferring the parison in the closed pre-form mold to a pre-form blowing location, inserting a blow pipe into the parison to essentially compression form the container finish, blowing the body pre-form, opening the pre-form mold to expose the pre-form on the blow pipe, returning the open pre-form mold to the parison forming location while (1) leaving the pre-form in place on the blow pipe and (2) aligning a final finish mold part with the pre-form finish, substantially simultaneously (1) closing the pre-form mold on a subsequently formed parison and (2) engaging the final finish mold part with the pre-form finish, removing said blow pipe, simultaneously transferring the pre-form mold to said pre-form blowing location and said pre-form to a final blowing location at which the body pre-form is interposed between the sections of an open final blow mold and said final finish mold part is adjacent the final blow mold, closing said final blow mold, inserting a different blow pipe into the pre-form finish confined in said final finish mold to compression form the container finish, and blowing the body pre-form to the configuration of the container body.

5. In a method of blow molding a plastic container, the steps of (1) enclosing a parison at a parison-forming location in a pre-form blow mold having a cavity defining a blown pre-form having a finish portion and a blown body portion somewhat smaller than the body of the final blown container, (2) transferring the parison in the closed pre-form mold to a pre-form blowing location, (3) blowing the pre-form, (4) opening the pre-form mold while retaining the pre-form in position at the pre-form blowing location, (5) returning the open pre-form mold to the parison forming location while leaving the pre-form in place, (6) utilizing step (5) to align a transfer mechanism with the finish portion of the pre-form, (7) closing the pre-form mold on a subsequent parison, (8) utilizing step (7) to engage the transfer mechanism with the finish portion of the pre-form, (9) transferring the pre-form mold with the subsequent parison therein to said pre-form blowing location, (10) utilizing step (9) to transfer the engaged pre-form to a final blowing location (11) enclosing the blown body portion only of the engaged blown pre-form in a final blow mold at said final blowing location, and, (12) blowing the pre-form body portion into the body portion of the final container.

6. In a method of blow molding a plastic article by the steps of enclosing a parison at a parison-forming location in a pre-form blow mold having a cavity defining a blown pre-form portion somewhat smaller than the corresponding portion of the final blown article, transferring the parison in the closed pre-form mold to a pre-form blowing location, at said location (1) compression forming one portion of the pre-form and (2) blowing the remainder of the pre-form, and opening the pre-form mold to expose the pre-form, the improvements of the returning the open pre-form mold to the parison forming location while retaining the pre-form in place, substantially simultaneously (1) closing the pre-form mold on a subsequent parison and (2) gripping the one portion of the pre-form while the pre-form is still retained in place, simultaneously (1) transferring the pre-form mold with the subsequent parison therein to said pre-form blowing location and (2) transferring said gripped pre-form to a fixed final blowing location, enclosing the blown portion only of the gripped pre-form in a final blow mold and blowing the blown portion of the pre-form at said fixed final blowing location to the configuration of the final article.

7. In a method of blow molding a plastic container having a finish portion and a blown body portion by the steps of enclosing a parison at a parison-forming location in a pre-form blow mold having a cavity defining both a container finish and a blown body pre-form somewhat smaller than the container body portion, transferring the parison in the close pre-form mold to a pre-form blowing location, inserting a blow pipe into the parison to essentially compression form the container finish, blowing the body pre-form, and opening the pre-form mold to expose the pre-form on the blow pipe, the improvements of returning the open pre-form mold to the parison forming location while (1) leaving the pre-form in place on the blow pipe and (2) aligning a final finish mold part with the pre-form finish, closing the pre-form mold on a subsequently formed parison, engaging the final finish mold part with the pre-form finish, removing said blow pipe, simultaneously transferring the pre-form mold with the subsequently formed parison therein to said pre-form blowing location and said engaged pre-form to a final blowing location at which the body pre-form is interposed between the sections of an open final blow mold and said final finish mold part is adjacent the final blow mold, closing said final blow mold, inserting a different blow pipe into the pre-form finish confined in said final finish mold to compression form the final container finish, and blowing the body pre-form to the configuration of the container body.

8. In a method of making a blown container from an extruded tubular parison by blowing the parison into a pre-form which is subsequently blown into a final container, the pre-form having (1) a finish essentially conforming to the container finish, (2) a blown pre-form body smaller than the body of the container and (3) an integral pinched tail, the improvements of engaging the finish of the pre-form with a final container finish mold, engaging the tail, transferring the engaged pre-form to a final blow molding location, relatively moving the engaged tail and the engaged finish to stretch the blown pre-form body, closing a finsl blow mold on the stretched body of the engaged pre-form and then blow molding the stretched pre-form body to the configuration of the container.

9. In a repetitive blow molding process wherein a parison is blown into a pre-form and the blown pre-form is subsequently blown into a final container having a finish portion and a blown body portion, the parison being transferred in a movable pre-form blow mold from a parison-forming station to a pre-form blowing station at which the parison is blown into the pre-form, the improvements of opening the pre-form blow mold, retaining the blown pre-form at the pre-form blowing station as the pre-form blow mold returns to the parison-forming station for a subsequently formed parison, substantially simultaneously closing the pre-form blow mold on the subsequently formed parison and closing a finish mold on a portion of the blown pre-form, simultaneously (1) transferring the subsequently formed parison to the pre-form blowing station and (2) transferring the finish mold and the previously blown pre-form to a fixed final blowing station and superimposing the finish mold on a final blow mold position at said final blowing station, the blown body portion of said pre-form being aligned with the cavity of the final blow mold defining the blown body portion of the container.

10. In a method of blow molding a plastic container having a finish and a blown body, the steps of (1) enclosing a parison at a parison-forming location in a pre-form blow mold having a cavity defining a blown pre-form somewhat smaller than the final blown article, (2) transferring the parison in the closed pre-form mold to a pre-form blowing location, (3) blowing the pre-form, (4) opening the pre-form mold while retaining the pre-form in position at the pre-form blowing location, (5) returning the open pre-form mold to the parison forming location while leaving the pre-form in place, (6) utilizing step (5) to align a finish mold with the pre-form, (7) closing the pre-form mold on a subsequent parison, (8) closing the finish mold on a portion only of the pre-form, (9) transferring the pre-form mold with the subsequent parison therein to said pre-form blowing location, (10) utilizing step (9) to transfer the finish mold and the pre-form to a final blowing location and, (11) blowing that portion of the pre-form not enclosed in the finish mold to the blown body of the plastic container.

* * * * *